July 18, 1939.  W. A. HEINZE  2,166,293
FLUID SEAL WITH WELDED HOUSING
Filed July 29, 1936
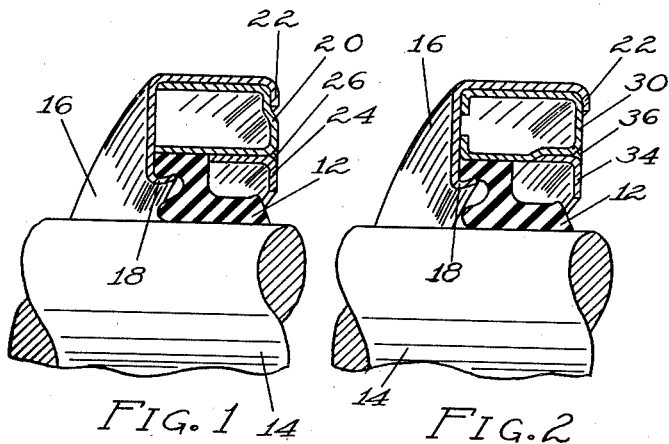
WILLIAM A. HEINZE
INVENTOR
PER Albert J Frike
ATTORNEY Patented July 18, 1939

2,166,293

UNITED STATES PATENT OFFICE 2,166,293

FLUID SEAL WITH WELDED HOUSING

William A. Heinze, Chicago, Ill., assignor to Victor Manufacturing & Gasket Company, Chicago, Ill., a corporation of Illinois Application July 29, 1936, Serial No. 93,198

1 Claim. (Cl. 288—3)

This invention relates to an improved fluid seal with welded housing and has for one of its principal objects the provision of a grease retainer or oil seal which includes a molded diaphragm or packing element of synthetic rubber or the like held in position about a shaft and in a surrounding housing by means of a supporting metal shell formed with two or more pieces welded or otherwise permanently fastened together.

One of the important objects of this invention is to provide, in a grease retainer or fluid seal, a permanent unitary structure which is constructed so as to be applied as a unit and which will not be subject to undesirable deformation or distortion during the process of application and which, therefore, will accordingly furnish a satisfactory seal under all conditions.

Another object of the invention is the provision of a fluid seal especially adapted for automotive use or the like, which can be employed with various types of diaphragms, particularly those known as synthetic, molded rubber or vulcanized diaphragms or packings, and which, on account of the peculiar nature of their composition and structure, can be made into various shapes to meet different requirements and adaptations, and which, therefore, are better suited to certain definite types of retaining shells or housings which heretofore have been considered impractical or even impossible.

Other and further important objects of the invention will be apparent from the disclosures in the accompanying drawing and following specification.

The invention, in a preferred form, is illustrated in the drawing and hereinafter more fully described.

In the drawing:

Figure 1 is a sectional view of an improved fluid seal showing the welded housing or retaining shell of this invention applied thereto.

Figure 2 is a sectional view showing a slight modification of the invention illustrated in Figure 1.

As shown in the drawing:

The reference numeral 12 indicates generally one of the improved diaphragms of this invention, the same comprising generally and preferably an annular element composed of synthetic rubber and other materials such as fabric or the like vulcanized in a mold to the shape shown or into other shapes which might be more preferable or better suited to particular purposes.

In the embodiment shown in Figures 1 and 2, the diaphragm 12 has a cylindrical portion adapted to closely surround a shaft 14, and extending upwardly from this cylindrical portion is a stem portion which terminates in a rearwardly extending annular flange or the like as shown, which flange is for the purpose of producing a gripped relationship between itself and corresponding portions of the shell.

In both Figures 1 and 2, this supporting shell comprises a cup-shaped element 16 of sheet metal or the like, having a central opening adapted to surround the shaft 14 and with an inturned ledge 18 adjacent this central opening, the ledge forming, as shown, an acute angle with the adjacent portion of the cup or shell 16, thereby adapting the same for a better gripping contact with the corresponding flared portion of the diaphragm or packing element 12.

Inasmuch as the diaphragm is composed of resilient material, it can be readily sprung or snapped into position over the inturned edge 18, and this, in itself, will ordinarily form a suitable bond between the two elements, which, however, for safety purposes, is supplemented by additional fastening means.

In Figure 1, this additional fastening means comprises an annular cup-shaped element 20 U-shaped in cross-section which is fitted inside the shell 16 and is of such dimensions as to closely contact the outer periphery of the related portion of the diaphragm 12 clamping the same between itself and the inturned ledge 18. This element is held in position in the shell 16 by spinning down or turning in the edge 22 of the shell as illustrated. In Figure 1, an offset or countersunk portion is provided in the element 20 for the reception of this inturned flange 22 of the shell 16.

In order to further and even more adequately and properly secure the diaphragm or packing element 12 in position in the housing, an additional fastening element 24 is provided which is also annular in shape and L-shaped in cross-section and of such a size as to be capable of a sliding or pressed fit into the inner annular face of the U-shaped element 20. The dimensions of one leg of the L are such that when fitted into position, the inner edge will closely contact the corresponding face of the diaphragm 12, thereby maintaining a gripping contact on at least three sides or faces of the diaphragm.

The L-shaped ring 24 is permanently secured in the U-shaped ring or shell 20 by means of welding or brazing which usually consists in melting a ring of some more fusible metal into the joint between these two steel elements 20 and 24 as best shown at 26 in Figure 1. This method of welding or brazing is common in the trade and usually employs a thin copper wire or strip, making a very strong and substantial joint between the steel parts.

In Figure 2, is shown a very similar construction, the elements 16—18—22 being the same and the element 30 serving the same purpose as the element 20 of Figure 1 with the exception that it is a slightly different shape and has inturned ends seated against the corresponding face of the shell 16. The U-shaped ring 30 is not offset to receive the inturned bend 22 but is offset to receive an L-shaped ring 34 corresponding to the ring 24 of Figure 1 which is welded in position in the same manner as shown at 36. It will be noted that there is no seating of the element 34 against the packing 12, there being more space left for the insertion of a garter spring or the like if the same is considered necessary, and it will further be noted that there is possibly a better reinforcement of the outer shell 16 on account of the inturned edges of the inner shell 30.

It will be evident that herein is provided a fluid seal which, on account of its welded type of housing and the composition diaphragm employed therewith, provides a substantial unitary structure which is so built as to effectively resist tendency to become damaged during installation, which has heretofore been one of the chief troubles encountered with oil seals or grease retainers of this type. Although made to quite exact dimensions, it has often been found that the housings for which they are intended are somewhat over or under size, and if under size, considerable care is necessary in installation in order to prevent damage to the housing. The welded type of housing, particularly that shown in Figures 1 and 2 will effectively withstand considerable hammering and also deformation which might arise from either faulty installation procedure or inaccurate fittings.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A fluid seal, comprising a flexible packing element L-shaped in cross section and being molded of synthetic rubber, and a metallic supporting housing therefor, said housing including an outer annular shell L-shaped in cross-section and a U-shaped shell inversely fitted in the outer shell with one leg of the U contacting the packing, and with one edge of the outer shell spun in about the corresponding portion of the U-shaped shell to retain the same in position, one edge of the outer shell being bent inwardly to contact a corresponding portion of the packing, and an inner smaller shell L-shaped in cross-section slidably fitted into the U-shaped shell with its inner edge abutting the packing and maintained in position by welding.

WILLIAM A. HEINZE.